(12) United States Patent
Yamaguchi et al.

(10) Patent No.: US 9,413,923 B2
(45) Date of Patent: Aug. 9, 2016

(54) IMAGING APPARATUS (75) Inventors: Takehito Yamaguchi, Osaka (JP);
Mitsuo Abe, Osaka (JP); Yuhiro Kobayashi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 752 days.

(21) Appl. No.: 13/354,399

(22) Filed: Jan. 20, 2012

(65) Prior Publication Data

US 2012/0188332 A1   Jul. 26, 2012

(30) Foreign Application Priority Data

Jan. 24, 2011   (JP) .................................. 2011-011666

(51) Int. Cl.
| H04N 1/00 | (2006.01) |
| H04N 1/21 | (2006.01) |
| H04N 5/232 | (2006.01) |
| H04N 13/02 | (2006.01) |
| H04N 101/00 | (2006.01) |

(52) U.S. Cl.
CPC ........... *H04N 1/215* (2013.01); *H04N 5/23293* (2013.01); *H04N 13/0221* (2013.01); *H04N 1/0044* (2013.01); *H04N 2101/00* (2013.01); *H04N 2201/212* (2013.01)

(58) Field of Classification Search
CPC ............ H04N 5/23238; H04N 5/2628; H04N 5/2259; G06T 3/4038; G02B 13/06
USPC .......................................................... 348/36
See application file for complete search history.

(56) References Cited

U.S. PATENT DOCUMENTS

| 8,115,801 | B2 * | 2/2012 | Mei ........................ G03B 37/00 348/36 |
| 2001/0000969 | A1 | 5/2001 | Ohta et al. |
| 2004/0046885 | A1 * | 3/2004 | Regan et al. ............. 348/333.11 |
| 2010/0097444 | A1 * | 4/2010 | Lablans .......................... 348/46 |
| 2011/0141228 | A1 * | 6/2011 | Shimada ......................... 348/36 |
| 2011/0304693 | A1 * | 12/2011 | Border et al. .................... 348/46 |

FOREIGN PATENT DOCUMENTS

| JP | 2001-275018 | 10/2001 |
| JP | 2002-148693 | 5/2002 |
| JP | 2003-009183 | 1/2003 |
| JP | 2005-303594 | 10/2005 |
| JP | 2007-267008 | 10/2007 |
| JP | 2007-318490 | 12/2007 |
| JP | WO2008/087721 | 7/2008 |

OTHER PUBLICATIONS

An abstract and the machine translation of JP4947060B which is corresponding to JPWO2008/087721.
Japanese Office Action issued in Japanese Patent Application No. 2012-010177 dated Jan. 7, 2015.

\* cited by examiner

*Primary Examiner* — Jay Patel
*Assistant Examiner* — Frank Huang
(74) *Attorney, Agent, or Firm* — Panasonic IP Management (57) ABSTRACT

An imaging apparatus includes a display unit, an imaging unit adapted to successively capture an image of a subject and successively generate image data, and a controller adapted to control a display of a display object displayed on the display unit to change the display object in a specific direction at a predetermined timing in a predetermined recording mode.

15 Claims, 10 Drawing Sheets

Fig. 10

IMAGING APPARATUS

BACKGROUND

1. Technical Field

The technical field relates to an imaging apparatus and, more particularly to an imaging apparatus having a function for capturing images while being moved.

2. Related Art

In recent years, along with spread of television sets for enabling display of three-dimensional videos, cameras that can record three-dimensional images are known. For example, JP 2003-9183 A discloses a camera that obtains a left-eye image and a right-eye image composing a three-dimensional image from a plurality of pieces of image information generated while a camera is being moved in a horizontal direction with respect to a subject.

SUMMARY

In capturing a 3D image using such a camera, if the user cannot grasp a direction in which the camera should be moved, the user cannot properly move the camera and cannot capture a desirable right-eye image and a left-eye image.

To overcome this problem, an imaging apparatus is provided, which enables a user to easily grasp the direction to move the imaging apparatus when the user takes images while moving the imaging apparatus.

In order to overcome the aforementioned problem, an imaging apparatus according to a first aspect includes a display unit, an imaging unit, and a controller. The imaging unit successively captures images of a subject to successively generate image data. The controller controls a display of a display object displayed on the display unit to change in a specific direction at a predetermined timing, in a predetermined recording mode.

The imaging apparatus according to the first aspect displays, on the display unit, the display object which changes at the predetermined timing in the direction of movement of the imaging apparatus, in the predetermined recording mode (a mode for capturing images with the imaging apparatus being moved by the user, for example). By referring to the change of the display object, the user can easily grasp the direction in which the imaging apparatus should be moved.

DETAILED DESCRIPTION OF PREFERRED EMBODIMENT

With reference to the accompanying drawings, a digital camera as an embodiment is described below.

1. Configuration of Digital Camera

Figure 1:
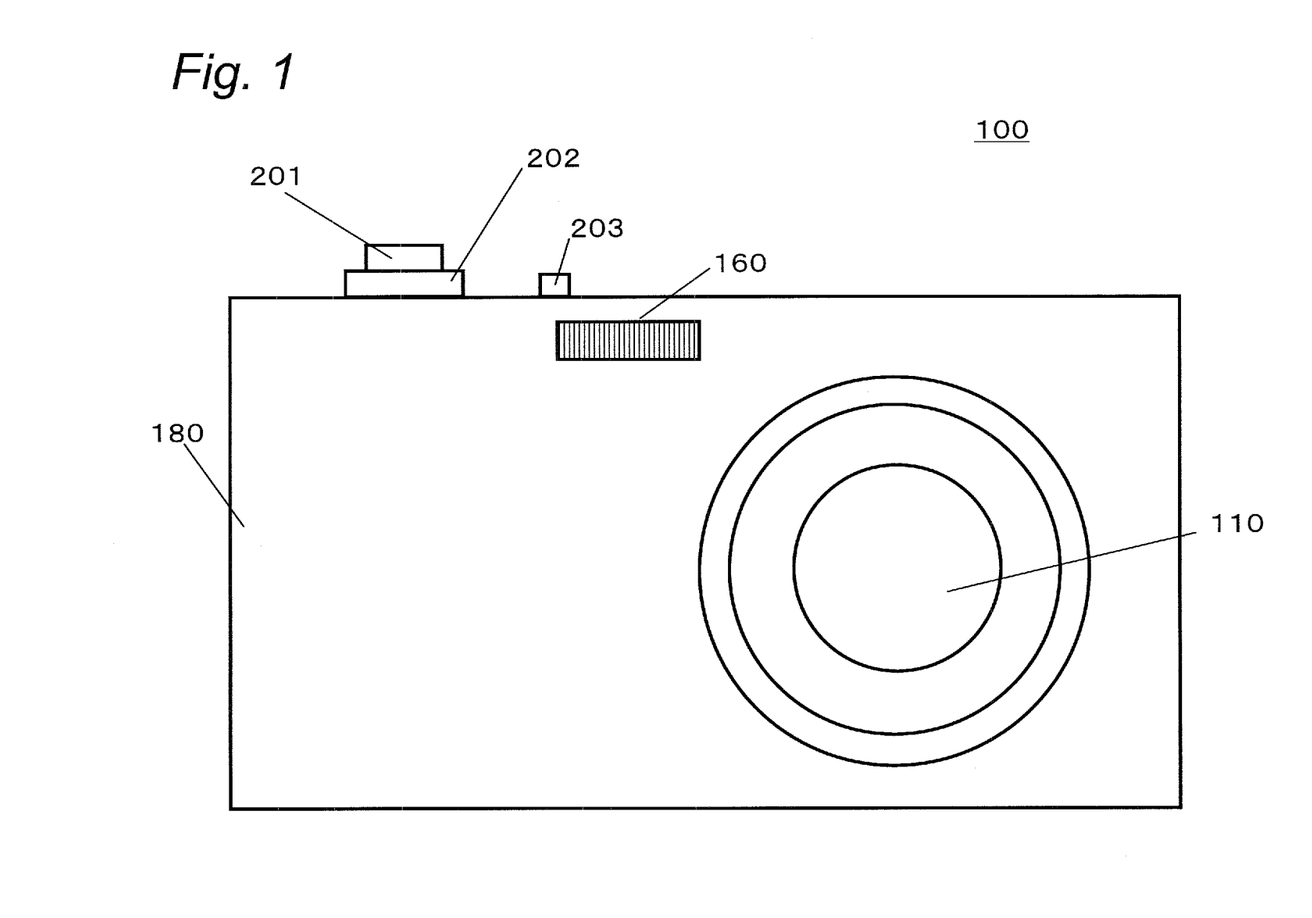
FIG. 1 is a front view of a digital camera.

With reference to FIG. 1, the configuration of the digital camera of the embodiment is described. The digital camera 100 includes, on its front surface, a lens barrel housing an optical system 110, and a flash 160. Further, the digital camera 100 includes, on its upper surface, operation buttons such as a release button 201, a zoom lever 202, and a power button 203.

Figure 2:
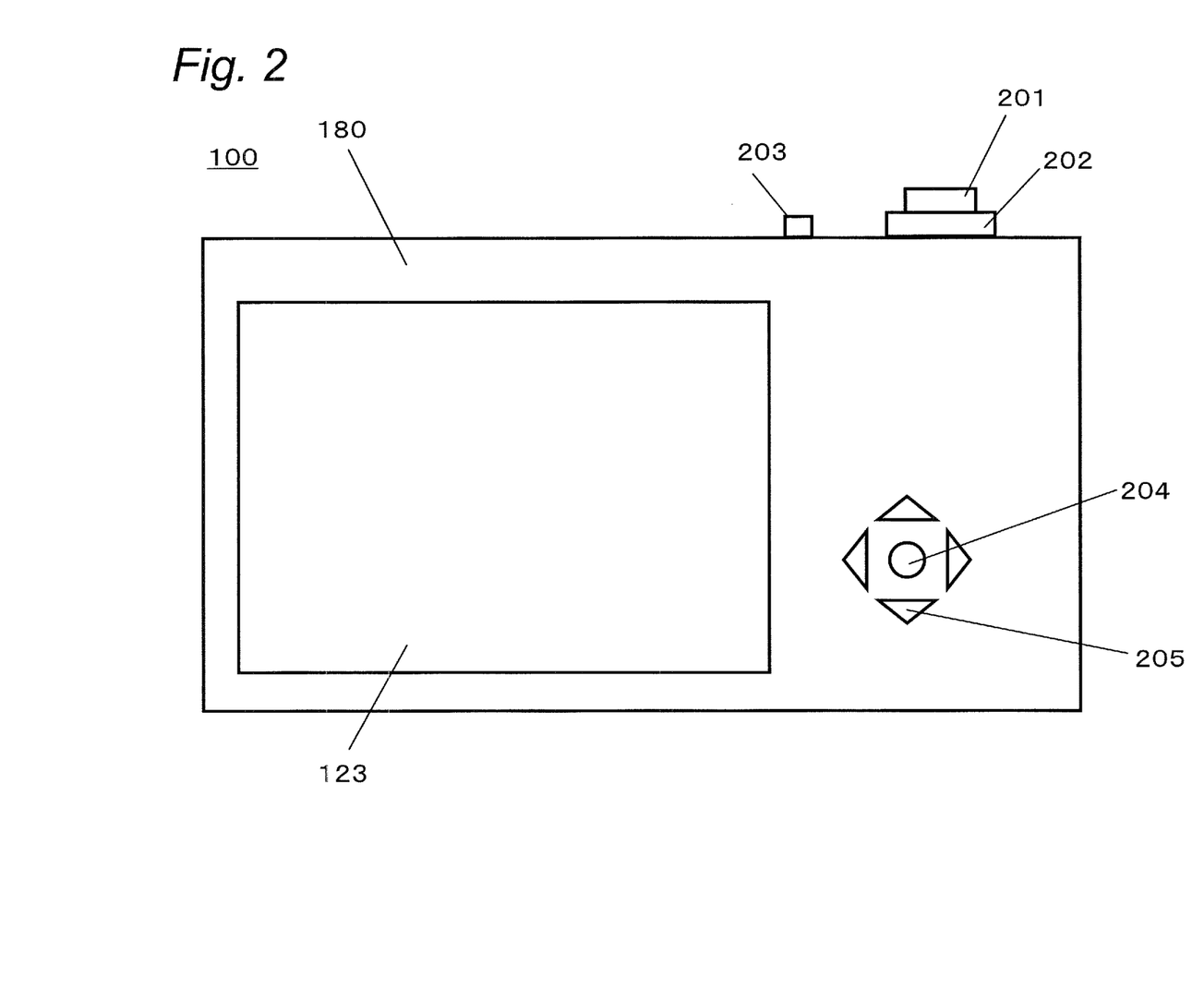
FIG. 2 is a rear view of the digital camera.

FIG. 2 is a rear view of the digital camera 100. The digital camera 100 includes, on its rear surface, a liquid crystal display monitor 123, and operation buttons such as a center button 204 and a cross button 205.

The liquid crystal display monitor 123 and the operation buttons are exposed at the outer side of a casing 180, but other electrical components are housed within the casing 180.

Figure 3:
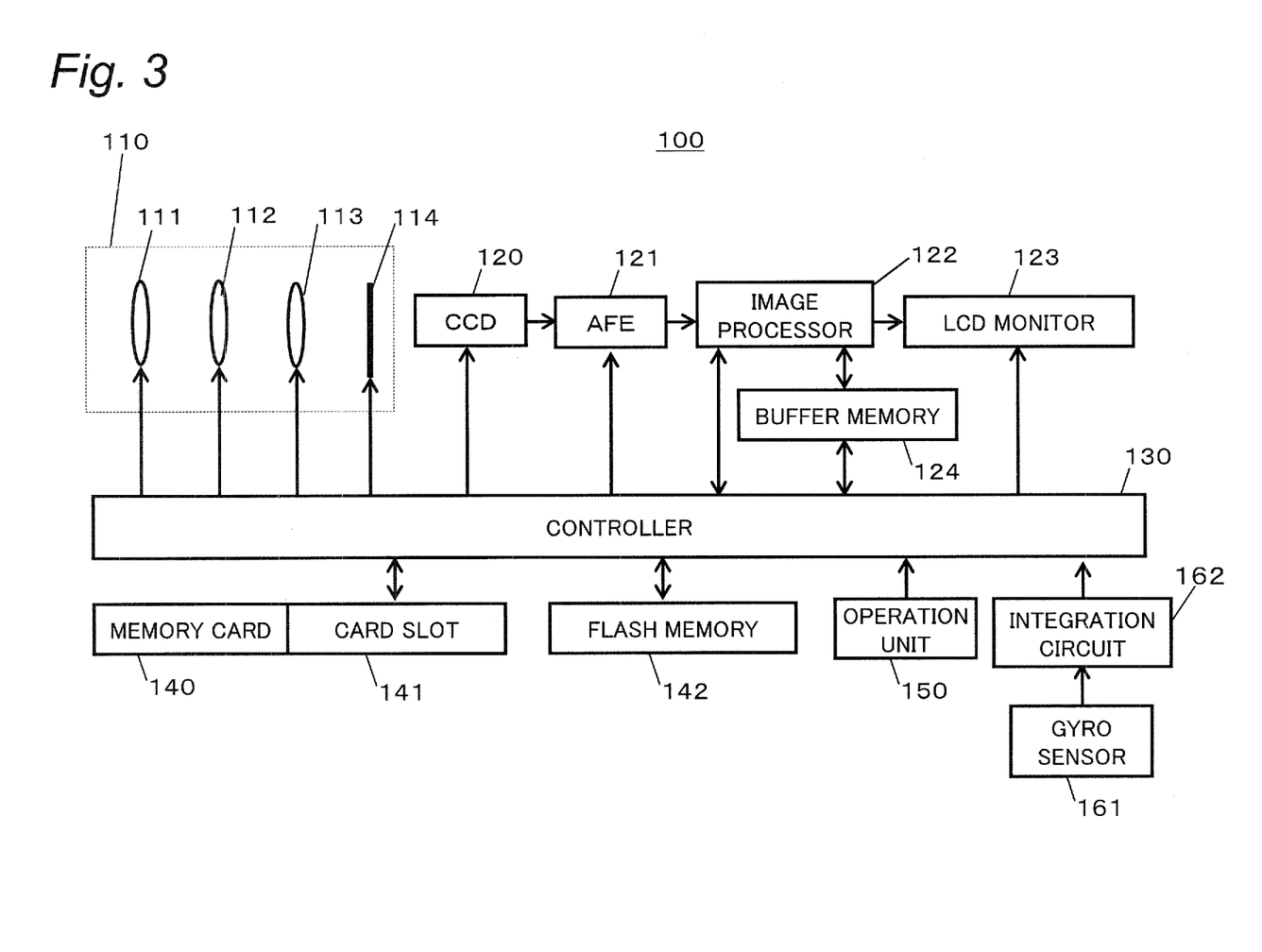
FIG. 3 is an electric block diagram of the digital camera.

FIG. 3 is an electrical block diagram of the digital camera 100. The digital camera 100 captures a subject image formed through the optical system 110 with a CCD image sensor 120. The CCD image sensor 120 generates image information based on the captured subject image. The image information generated by the CCD image sensor 120 is subjected to various processing by an AFE (Analog Front End) 121 and an image processor 122. The image information subjected to the various processing is recorded in a flash memory 142 or a memory card 140. The image information recorded in the flash memory 142 or the memory card 140 is displayed on the liquid crystal display monitor 123 according to user's operation on an operation unit 150. The configurations of the respective components illustrated in FIGS. 1 to 3 are described in detail below.

The optical system 110 is composed of a focus lens 111, a zoom lens 112, an optical camera shake correction lens (OIS: Optical Image Stabilizer) 113, a shutter 114, and the like. Here, each lens composing the optical system 110 can be constituted by any number of lenses or by any number of groups of lenses. The optical camera shake correction lens 113 can be moved to displace the optical axis of the optical system 110. Even if a shake of the casing 180 occurs, the optical camera shake correction lens 113 can be moved in a direction to reduce blur in subject image.

The focus lens 111 is used for adjusting the state of focusing for the subject. The zoom lens 112 is used for adjusting an angle of view of the subject. The shutter 114 is for adjusting an exposure time for light incident on the CCD image sensor 120. The focus lens 111, the zoom lens 112, the optical camera shake correction lens 113 and the shutter 114 are driven by the respective driving units such as a DC motor, and a stepping motor, according to control signals supplied from a controller 130.

The CCD image sensor 120 captures a subject image formed through the optical system 110 to generate image information. The CCD image sensor 120 generates image information of a new frame at a predetermined frame rate (for example, 30 frames per second). The controller 130 controls image-data generation timing and electronic shutter operation in the CCD image sensor 120. The liquid crystal display monitor 123 displays the image data as a through image, one by one, so that a user can confirm a state of the subject in real time.

The AFE 121 performs noise reduction by correlated double sampling, gain multiplication based on ISO sensitivity value by an analog gain controller, and AD conversion with an AD converter on image information input from the CCD image sensor 120. Thereafter, the AFE 121 outputs the image information to the image processor 122.

The image processor 122 performs various types of processes on image information output from the AFE 121. Such various types of processes include BM (Block Memory) integration, smear correction, white balance correction, gamma correction, a YC conversion process, electronic zoom process, compression process, decompression process, and the like, but the various types of processes are not limited thereto. The image processor 122 can be constituted by a hardwired electronic circuit or a microcomputer employing programs, or the like. Also, the image processor 122 can be integrated into a single semiconductor chip together with other functional devices such as the controller 130.

The gyro sensor 161 detects shakes in the direction of yawing and shakes in the direction of pitching, with respect to the optical axis of the optical system 110, based on angle change of the digital camera 100 per unit time (angular velocity). The gyro sensor 161 outputs a gyro signal indicative of detected angular velocity to an integration circuit 162.

The integration circuit 162 integrates a signal indicative of angular velocity (hereinafter, referred to as "gyro signal") which is output from the gyro sensor 161, further generates an integration signal (a signal indicative of angle), and outputs it to the controller 130. On receiving the integration signal output from the integration circuit 162, the controller 130 can grasp the rotational angles of the casing in the yawing direction and in the pitching direction, with respect to the optical system 110. Further, before the integration processing on the gyro signal, the integration circuit 162 may cut off unnecessary direct-current component, perform amplification processing on the gyro signal having the direct-current component cutoff, and then cut off higher-frequency components from the amplified signal.

The liquid crystal display monitor 123 is provided on the rear surface of the digital camera 100. The liquid crystal display monitor 123 displays an image based on image information processed by the image processor 122. The image displayed on the liquid crystal display monitor 123 includes a through image and a recorded image. The through image is an image which is provided by successively displaying an image of a frame generated at constant time interval by the CCD image sensor 120. In general, when the digital camera 100 is in a recording mode, the image processor 122 generates a through image from image information generated by the CCD image sensor 120. The user can perform shooting an image while checking the composition of the subject by referring to the through image being displayed on the liquid crystal display monitor 123. The recorded image is an image which is provided by reducing a moving image or a still image with higher resolution, which are recorded in the memory card 140 and the like, into a lower-resolution size image for display on the liquid crystal display monitor 123, when the digital camera 100 is in a playback mode.

The controller 130 controls operations of the entire digital camera 100. The controller 130 can be constituted by a hardwired electronic circuit or by a microcomputer or the like. Also, the controller 130 can be integrated into a single semiconductor chip together with the image processor 122 and the like.

Further, the controller 130 supplies exposure timing pulses to the CCD image sensor 120. The CCD image sensor 120 performs an operation for capturing a subject image according to the timing at which the exposure timing pulses are supplied from the controller 130. Since the controller 130 continuously supplies exposure timing pulses, the CCD image sensor 120 can continuously capture subject images to generate image information. Further, the controller 130 can adjust an interval of timing to supply exposure timing pulses, thereby adjusting the interval at which the CCD image sensor 120 continuously captures images.

Further, the controller 130 obtains an integration signal (angle signal) from the integration circuit 162, in synchronization with the timing to supply timing pulses to the CCD image sensor 120. It is possible to properly change the difference (the delay) between the timing at which the controller 130 supplies timing pulses and the timing at which the controller 130 obtains the integration signal. However, it is desirable that the controller 130 obtains the integration signal at the same timing as that at which the CCD image sensor 120 generates image information.

Further, the controller 130 can set a recording mode of the digital camera 100 to a "slide 3D recording mode". The "slide 3D recording mode" refers to a recording mode in which the user can perform shooting while moving the digital camera 100 for obtaining a left-eye image and a right-eye image for generating a 3D image. For example, the controller 130 sets the recording mode of the digital camera 100 to the slide 3D recording mode according to user's operation on a menu button. The digital camera 100 has other modes including a 2D recording mode and a playback mode.

Further, the controller 130 can drive the optical camera shake correction lens OIS 113 in a direction to reduce blur in a subject image based on rotational-angle information about the casing 180 with respect to the optical axis of the optical system 110 which is obtained from the integration circuit 162.

Further, the controller 130 can adjust the exposure time (the shutter speed) in capturing images to realize correct exposure for a subject image. Here, the exposure time is the inverse of the shutter speed. Namely, the controller 130 sets the shutter speed to be faster to make the exposure time shorter. On the other hand, the controller 130 sets the shutter speed to be slower to make the exposure time longer.

The flash memory 142 functions as an internal memory for storing image information and the like. Further, the flash memory 142 stores programs relating to auto focus (AF) control, auto exposure (AE) control, and control for light emission of the flash 160 and, further, stores programs for overall control of operations of the entire digital camera 100. Further, the flash memory 142 stores a correspondence table including information indicative of a relationship between an amount of pixel movement and stereo base. "An amount of pixel movement" refers to the difference between a position of a characteristic area in one image and a position of the same characteristic area in another image, these images resulted from shooting in the slide 3D recording mode. The difference between these positions is expressed by a number of pixels. The "characteristic area" is a characteristic portion in the image (such as an area of a human face, for example) which is to be subjected to a comparison for calculating the amount of pixel movement. The "stereo base" is a distance between the respective shooting positions for a left-eye image and a right-eye image necessary for generating a 3D image. In the digital camera 100 according to the present embodiment, the flash memory 142 stores a correspondence table indicative of a relationship between the amount of pixel movement and the stereo base in cases where a subject is at a distance of 1 meter from the digital camera 100. The controller 130 can grasp the relationship between the amount of pixel movement and the stereo bases by accessing the correspondence table stored in the flash memory 142. Further, the flash memory 142 stores reference-distance information about a desirable stereo base for the user to view 3D images. The "desirable stereo base for viewing 3D images" refers to a stereo base which desirably enables the user to view 3D images, when the digital camera 100 displays, in a 3D manner, left-eye images and right-eye images. The controller 130 can grasp the reference-distance information about the stereo base by accessing the flash memory 142.

A buffer memory 124 is a storage device which functions as a work memory for the image processor 122 and the controller 130. The buffer memory 124 can be realized by a DRAM (Dynamic Random Access Memory) or the like.

A card slot 141 is a connection device to and from which the memory card 140 can be connected and disconnected. The memory card 140 can be electrically and mechanically connected to the card slot 141. Further, the card slot 141 can also have a function of controlling the memory card 140.

The memory card 140 is an external memory including, inside thereof, a recording unit such as a flash memory. The memory card 140 is capable of recording, therein, data such as image information to be processed by the image processor 122.

The operation unit 150 collectively refers to the operation buttons and the operation lever which are provided on the exterior of the digital camera 100 and is adapted to receive user's operations. The operation unit 150 includes, for example, the release button 201, the zoom lever 202, the power button 203, the center button 204 and the cross button 205 which are illustrated in FIG. 1 and FIG. 2. The operation unit 150 supplies operation command signals to the controller 130, according to user's operations thereon.

The release button 201 is a push-type button capable of being in two-step states which are a half-press state and a full-press state. When the user half-presses the release button 201, the controller 130 performs auto focus control and auto exposure control to determine shooting conditions. Subsequently, when the user full-presses the release button 201, the controller 130 records image information generated by the CCD image sensor 120 at the timing of the full-pressing, as a still image in the memory card 140 or the like.

The zoom lever 202 is a center-position self-restoring type lever which has a wide-angle end and a telephoto end for adjustment of the angle of view. When the user operates the zoom lever 202, the zoom lever 202 supplies an operation command signal for driving the zoom lens 112 to the controller 130. Namely, when the zoom lever 202 is operated to the wide-angle end, the controller 130 controls the zoom lens 112 such that a subject is shot at a wide angle. Similarly, when the zoom lever 201 is operated to the telephoto end, the controller 130 controls the zoom lens 112 such that a subject is shot in a telephoto angle.

The power button 203 is a push-type button for turning on and off the supply of electric power to respective components of the digital camera 100. When the user pushes the power button 203 while the digital camera 100 is in a power-OFF state, the controller 130 supplies electric power to the respective components of the digital camera 100 to activate them. Further, when the user pushes the power button 203 while the digital camera 100 is in a power-ON state, the controller 130 stops the supply of electric power to the respective components.

The center button 204 is a push-type button. in cases where the digital camera 100 is in the recording mode or in the playback mode, when the user pushes the center button 204, the controller 130 displays a menu screen on the liquid crystal display monitor 123. The menu screen is a screen for enabling the user to set various types of conditions for recording/playback. If the center button 204 is pressed in a state where one of setting items for various types of conditions is selected, the selection of the setting items is finally decided. Namely, the center button 204 also functions as a set button.

The cross button 205 is a push-type button which is provided in upward, downward, leftward and rightward directions. When the user pushes the cross button 205 at its portion corresponding to any of the directions, a selection is made from various types of items being displayed on the liquid crystal display monitor 123.

2. Operations

The digital camera 100 having the aforementioned structure will be described, in terms of operations thereof. The digital camera 100 has the slide 3D recording mode. In the slide 3D recording mode, the user slides the digital camera 100 from a left-hand side to a right-hand side, while holding the casing 180 of the digital camera 100. During such a sliding operation, the controller 130 performs control for causing the CCD image sensor 120 to successively capture plural images. Hereinafter, a continuous recording operation with the digital camera 100 being moved in the slide 3D recording mode will be referred to as a "slide continuous recording operation". After the completion of capturing of plural images, the controller 130 extracts, out of these plural images, two images (a left-eye image and a right-eye image) suitable for generating a 3D image. Hereinafter, such an operation of the digital camera 100 in the slide 3D recording mode will be described, in detail.

2-1. Operation in Slide 3D Recording Mode

Figure 4:
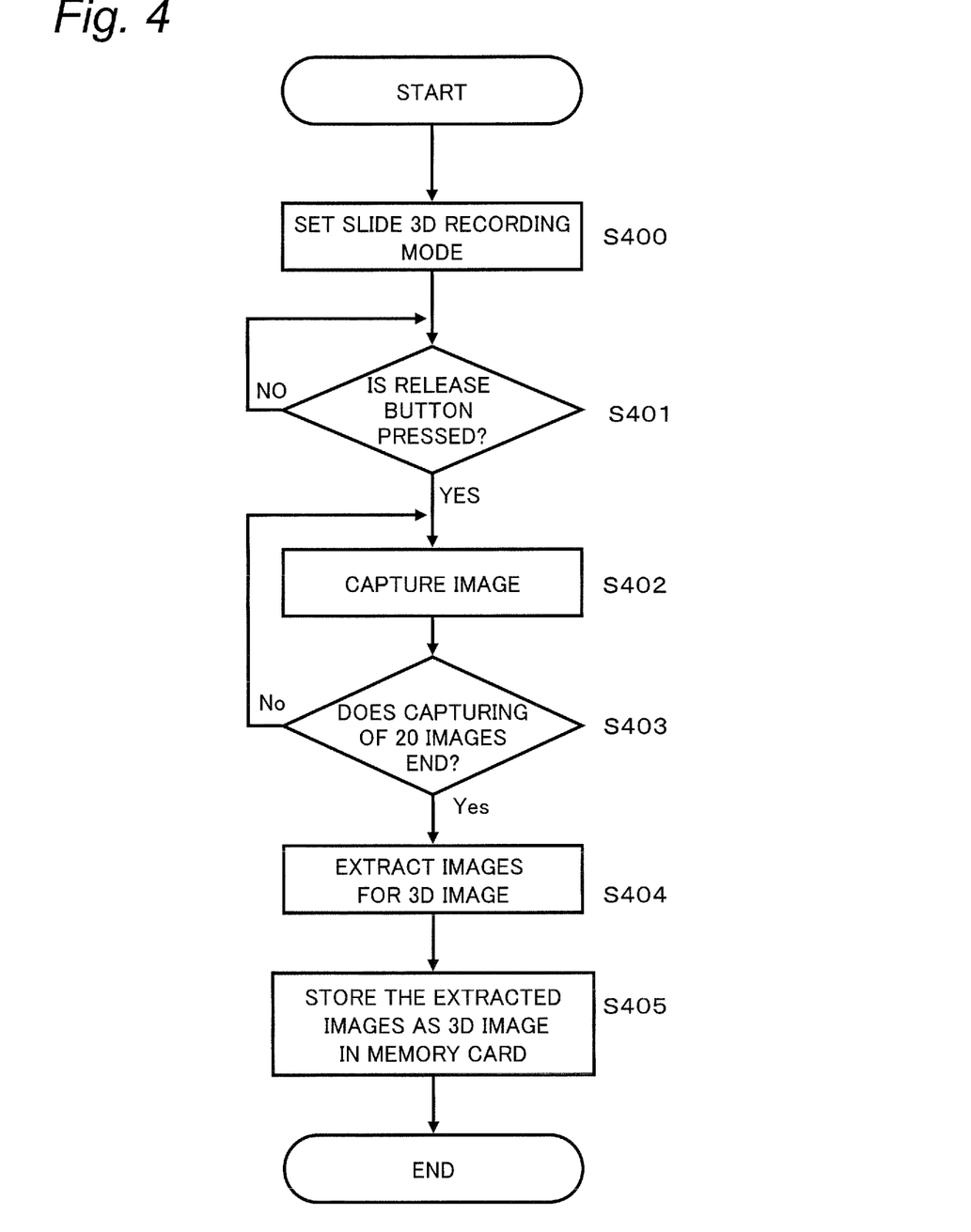
FIG. 4 is a flow chart of operations in a slide 3D recording mode.

An operation of the digital camera 100 in the slide 3D recording mode is described below with reference to FIG. 4. If the slide 3D recording mode is set by the user, the controller 130 performs control for bringing the respective units of the digital camera 100 into a state where it can perform the slide continuous recording operation (S400). In this state, the controller 130 monitors whether or not the user has pressed the release button 201 (S401). The controller 130 continuously keeps monitoring it, until the user presses the release button 201 (No in S401). If the user presses the release button 201 (Yes in S401), the controller 130 starts a slide continuous recording operation (S402).

The slide continuous recording operation can be started at the timing at which the release button 201 is pressed or can be started after the elapse of a predetermined time from when the release button 201 is pressed. The number of images captured by the continuous recording can be properly set and, hereinafter, it is assumed to be 20, as an example.

The controller 130 determines whether or not the number of captured images has reached 20, after the start of the slide continuous recording operation (S403). If the number of captured images has not reached 20, the controller 130 repeats the operations in the steps S402 to S403 until the number of captured images reaches 20. If the number of captured images has reached 20, the controller 130 completes the slide continuous recording operation. After completing the slide continuous recording operation, the controller 130 performs an operation for extracting images for a 3D image (S404). In the operation for extracting images for a 3D image, two images satisfying predetermined conditions are extracted from the plural images generated through the slide continuous recording operation. The operation for extracting images for a 3D image (S404) is described later, in detail. The controller 130 records the extracted two images as a 3D image in the memory card 140 (S405).

2-2. Slide Movement of Digital Camera

Figure 5A:
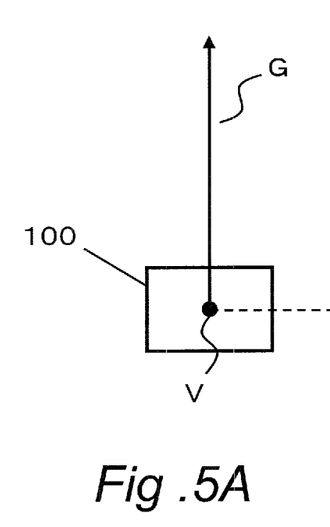
FIGS. 5A to 5C are views for illustrating a movement of the digital camera in the slide 3D recording mode.
Figure 5B:
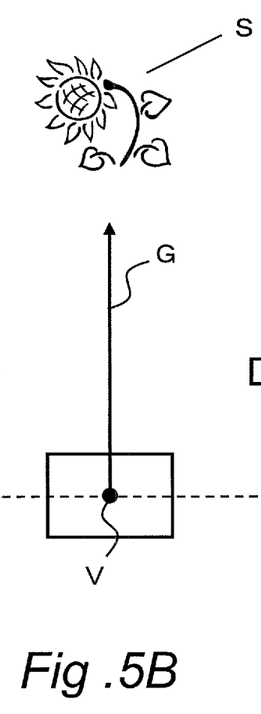
Figure 5C:
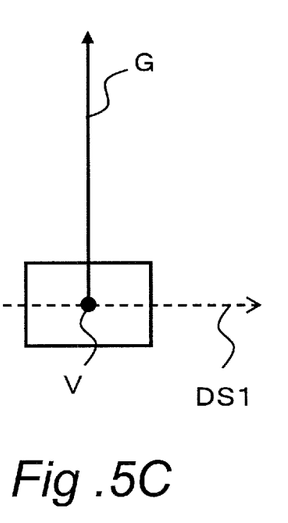

With reference to FIG. 5, movement of the digital camera 100 in the slide 3D recording mode is described. In FIG. 5, indicates a subject, "G" indicates the direction of the line of sight of the digital camera 100 (the direction of the optical axis of the optical system 110), "V" indicates the point of view of the digital camera 100 (the position of the CCD image sensor 120), and "DS1" indicates a locus of the point of view V. As illustrated in FIG. 5, during a slide continuous recording operation, the user slides the digital camera 100 from a left-hand side to a right-hand side while holding the digital camera 100 with both hands (FIG. 5A→5B→5C). During the sliding movement, the position of the CCD image sensor 120 (the point of view V) in the casing 180 is moved in the direction of sliding, but the direction (the direction G of the line of sight) to the subject S which is viewed from the position of the CCD image sensor 120 (the point of view V) is substantially the same. Namely, in the slide 3D recording mode, the CCD image sensor 120 successively generates plural images substantially on the same plane. As described above, the digital camera 100 sequentially captures images while being slid, which enables generation of parallax images of the subject S even with the single-lens imaging device. The "parallax images" refers to plural images for generating 3D image which are captured at different shooting positions.

2-3. Guiding Display about Direction of Sliding

Figure 6A:
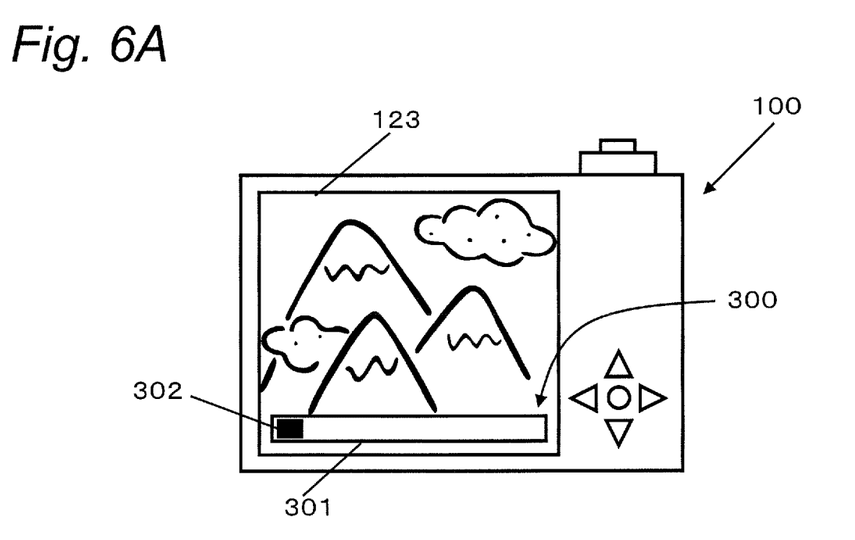
FIGS. 6A and 6B are views illustrating a display on a display unit in the slide 3D recording mode.
Figure 6B:
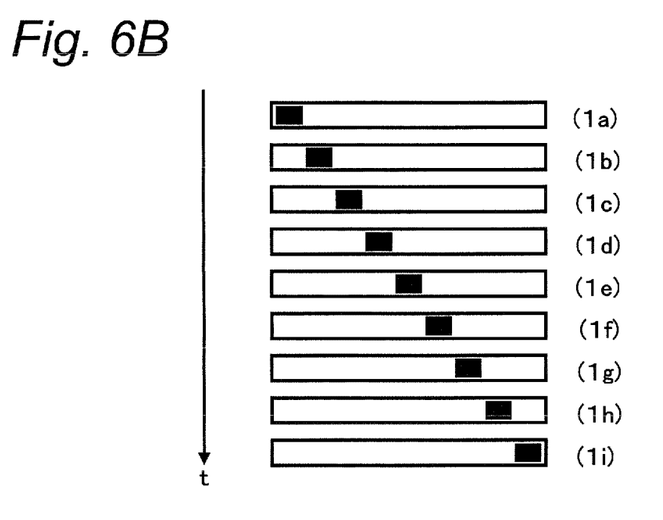

With reference to FIG. 6, a guiding display about the direction of sliding is described below, which is displayed on the liquid crystal display monitor 123, in the slide 3D recording mode. FIG. 6A illustrates an exemplary display on the liquid crystal display monitor 123 in the slide 3D recording mode. FIG. 6B is a view illustrating change in the guiding display about the direction of sliding, in the slide 3D recording mode. As illustrated in FIG. 6A, the digital camera 100 according to the present embodiment is adapted to display a display bar 300, as a guiding display about the direction of sliding, on the liquid crystal display monitor 123. If the digital camera 100 is set in the slide 3D recording mode, the controller 130 displays the display bar 300 on the liquid crystal display monitor 123. In displaying the display bar 300 on the liquid crystal display monitor 123, the controller 130 superimposes the display bar 300 on a through image of the subject image and displays them on the liquid crystal display monitor 123. Since the display bar 300 is displayed while it is superimposed on the through image, the user can check the display bar 300 and, at the same time, can check the through image for adjusting the angle of view for the subject image.

The display bar 300 is composed of a display frame 301 and a mark 302. The mark 302 is displayed inside the display frame 301. The lateral length of the mark 302 is set to be equal to the length of the display frame 301 which is divided by the number of images to be recorded in the continuous recording. During the continuous recording in a sliding 3D recording manner (S402 in FIG. 4), the controller 130 moves the mark 302 in the display frame in a predetermined direction. Namely, the controller 130 moves the mark 302 in the display frame 301, in the direction that the user should slide and move the digital camera 100.

Further, during the continuous recording in the slide 3D recording mode, the controller 130 successively and temporarily displays the captured images on the liquid crystal display monitor 123. Such a captured image being temporarily displayed on the liquid crystal display monitor 123 is referred to as "preview image". When the preview image is displayed on the liquid crystal display monitor 123, the controller 130 displays the display bar 300 on the liquid crystal display monitor 123 while superimposing the display bar 300 on the preview image. Displaying the display bar 300 and the preview image on the liquid crystal display monitor 123 with the display bar 300 superimposed on the preview image allows the user to check the progress of the display bar 300 and, at the same time, also to check the image continuously recorded.

With reference to FIG. 6B, an operation for displaying a display indicating the direction of sliding in the slide 3D recording mode. The vertical axis t represents the elapsed time. (1a) to (1i) represent the displays of the display bar 300 at the respective times. Hereinafter, it is assumed that the user moves the digital camera 100 from a left side to a right side in the slide 3D recording mode.

At the time the digital camera 100 is just set to the slide 3D recording mode (S400 in FIG. 4), the mark 302 is positioned at the left end of the display frame 301 and is stopped, as illustrated in (1a) of FIG. 6B. The user confirms the subject to be shot while viewing through images displayed on the liquid crystal display monitor 123. After confirming that the subject to be shot has been brought into a desired composition, the user presses the release button 201. When the user presses the release button 201, the controller 130 starts a slide continuous recording operation (S402 in FIG. 4).

After the start of the slide recording, the mark 302 moves in the left-to-right direction in the display frame 301. The controller 130 displays the mark 302 on the liquid crystal display monitor 123 such that the mark 302 moves in proportion to the number of images continuously captured. Namely, the controller 130 moves the mark 302 in the display frame 301 from the position shown in (1a) to the position shown in (1i) in FIG. 6B in order to give the user a guidance as to the direction in that the user should move or slide the digital camera 100. When a first image is captured during the continuous recording, the mark 302 is positioned at the left end within the display frame 301 (1a). Further, when the order of continuously captured image is in the middle of all of the continuously recorded images, the mark 302 is positioned at the center of the display frame 301 (1e). When a last image is captured, the mark 302 is positioned at the right end in the display frame 301 (1i). Such movement of the mark 302 is based on the timing at which the continuously captured image is generated. Accordingly, regardless of whether or not the digital camera 100 is being moved, the mark 302 moves according to the timing at which the continuously captured image is generated.

After the completion of the continuous recording in the slide 3D recording mode, the controller 130 displays as performs preview-displaying of the last-captured image on the liquid crystal display monitor 123. Subsequently and after the elapse of a predetermined time (about several seconds), the controller 130 returns to a recording standby state before the start of sliding 3D recording (S400 in FIG. 4). After the controller 130 returns to the recording standby state before a start of the slide 3D recording, the mark 302 is displayed in a state where it is rested at the left end in the display frame 301 ((1a) in FIG. 6B).

As described above, in the slide 3D recording mode, in order to enable the user to grasp the direction in which the digital camera 100 should be moved or slid, the controller 130 displays the mark 302 on the liquid crystal display monitor 123 while moving the mark 302 according to the progress of the continuous recording. Since the mark 302 is displayed as described above, the user can easily grasp the direction in and the speed at which the digital camera 100 should be slid or moved.

2-4. Adjustment of Lower Limit of Shutter Speed

In the slide 3D recording mode, since the user performs shooting while moving the digital camera 100, image blur tends to occur in the direction of movement in the captured image. If such image blur is large, the image has unclear outlines and lower image quality. If processing for generating 3D images is performed based on such images with lower image qualities, the final image quality is deteriorated. Accordingly, it is desirable that the controller 130 sets the shutter speed to the possible fastest value in order to suppress such image blur.

Figure 7:
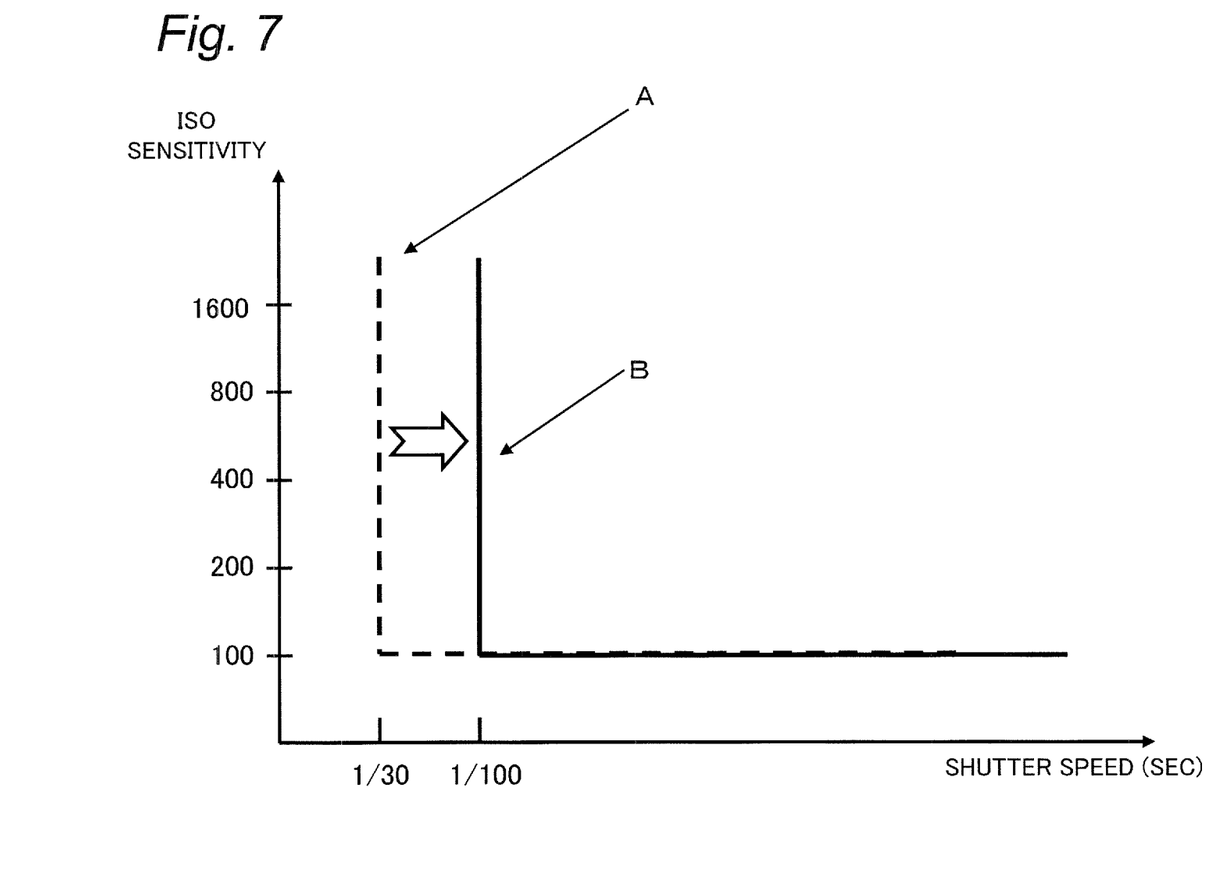
FIG. 7 is a view for illustrating a program diagram shift in the slide 3D recording mode.

With reference to FIG. 7, changing of the setting of the shutter speed in the slide 3D recording mode is described below. FIG. 7 is a view for describing a program diagram shift in the slide 3D recording mode. In FIG. 7, for convenience of the description, a program diagram for normal recording is also illustrated. The "normal recording" refers to recording with the digital camera 100 not being slid nor moved. Normal recording also includes continuous recording, as well as single recording, provided that the digital camera 100 is not moved during the shooting. In FIG. 7, the lateral axis represents the shutter speed. The shutter speed becomes shorter (faster) as it goes rightward on the lateral axis. The vertical axis represents the ISO sensitivity. In FIG. 7, a broken line A represents a program diagram for the normal recording. A solid line B represents a program diagram for the slid 3D recording. The vertical lines of the broken line A and the solid line B represent the lower limits of the shutter speed which can be set by the controller 130, respectively. The lateral lines of the broken line A and the solid line B represent the lower limit of the ISO sensitivity which can be set by the controller 130, respectively.

As illustrated in FIG. 7, when the digital camera 100 is set in the slide 3D recording mode, the controller 130 changes the lower limit value of the shutter speed, which is adjustable, to be faster than that in cases where the digital camera 100 is set in the normal recording mode. Namely, when the slide 3D recording mode is set, the longest exposure time, which is adjustable, is changed to be shorter than that in the normal recording mode. Since the lower limit value of the shutter speed is changed as described above, it is possible to suppress image blur which may be induced during capturing images in the slide 3D recording mode.

As a method for suppressing image blur in the slide 3D recording, there is a method which sets the ISO sensitivity to a higher value. However, this method makes conspicuous image noises, and therefore, it is not preferable. In order to suppress noises, it is desirable that the ISO sensitivity is as small as possible. Therefore, in cases where the illuminance of the subject gradually decreases, the controller 130 controls the respective units to lower the ISO sensitivity as much as possible and to slow the shutter speed (to increase the exposure time). However, if the shutter speed is excessively slower, image blur is induced, thereby largely degrading the image quality. Therefore, there is provided the lower limit value of the shutter speed. When the illuminance of the subject is further decreased, the controller 130 properly increases the ISO sensitivity after the shutter speed reaches the lower limit value.

More specifically, as illustrated in FIG. 7, in the normal recording, even if the illuminance of the subject decreases, the controller 130 does not increase the ISO sensitivity and maintains the setting of the ISO sensitivity at 100 until the shutter speed becomes 1/30 second. If the subject illuminance further decreases even after the shutter speed becomes 1/30 second, the controller 130 starts a correct exposure adjustment by increasing the ISO sensitivity.

On the other hand, in the slide 3D recording, the lower limit value of the shutter speed is set to 1/100 second, which is faster than 1/30 which is the shutter-speed lower limit value in the normal recording. Accordingly, in the slide 3D recording, even if the subject illuminance decreases, the controller 130 does not increase the ISO sensitivity and maintains the setting of the ISO sensitivity at 100, until the shutter speed becomes 1/100 second. If the subject illuminance further decreases even after the shutter speed becomes 1/100 second, the controller 130 starts a correct exposure adjustment by increasing the ISO sensitivity.

Further, in higher-illuminance environment, there is no need for exposure adjustment with the ISO sensitivity, and therefore the controller 130 sets the ISO sensitivity to the lowest value of 100. As the environmental illuminance increases, the controller 130 makes the shutter speed faster (the exposure time is made shorter). When the environmental illuminance is significantly higher and the shutter speed reaches an upper limit value, the controller 130 increases an aperture value to adjust light amount optimally.

Further, as a method for suppressing image blur, there is a method which utilizes a camera shake correcting function, besides the method utilizing the shutter speed. The camera shake correcting function is a function of moving the optical camera shake correction lens 113 in such a direction as to cancel movement of the digital camera 100. However, if the optical camera shake correction lens 113 is operated during the slide continuous recording operation, the recording is performed in a state where the optical camera shake correction lens 113 is in contact with an end of the lens frame, thereby inducing the problem of degradation of the image quality of generated image. Accordingly, this method is not suitable. Although the camera shake correcting function is a function effective in preventing camera shakes during the normal recording, it is not always an effective function for addressing image blur during the slide continuous recording operation. Accordingly, it is desirable for the controller 130 to restrict the camera shake correcting function during the slide continuous recording operations.

A camera-shake detection signal can be divided into components in the horizontal direction and in the vertical direction of the digital camera 100. In cases where the camera-shake correcting function can be independently set for components in the respective directions, it is possible to restrict the camera-shake correcting function only against a component in the direction in which the camera shake correction lens is in contact with the end of the lens frame during the slide continuous recording operation. By doing this, it is possible to effectively exert the camera-shake correcting function for the direction in which the camera shake correction lens is not in contact with the end of the lens frame. In the present embodiment, the casing 180 of the digital camera 100 is moved in the horizontal direction, and therefore the digital camera 100 is adapted to restrict the camera-shake correcting function in the horizontal direction, while not restricting the camera-shake correcting function in the vertical direction.

For the aforementioned reason, the digital camera 100 according to the present embodiment is adapted to restrict the camera-shake correcting function in the horizontal direction, and therefore the controller 130 utilizes the fastest possible shutter speed, as a method for suppressing image blur. When the camera shake correction lens operates, even if the lower limit value of the shutter speed is set to be a value of a slower shutter speed, it is possible to avoid blur of subject image with the camera shake correction lens. However, if the camera-shake correcting function is restricted, it is impossible to avoid blur of subject image, without setting the lower limit value of the shutter speed to be a value of a faster shutter speed in comparison with the case where the camera shake correction lens functions. Therefore, as illustrated in FIG. 7, when the slide 3D recording mode is set, the lower limit value of the shutter speed, which is adjustable, is set to be a value of a faster shutter speed than that when the camera-shake correcting function is utilized. Namely, when the slide 3D recording mode is set, the operation of the camera shake correction lens in the horizontal direction is restricted and, also, the longest exposure time, which can be adjusted by the controller 130, is set to be shorter than that in cases where the camera shake correction lens is operated.

2-5. Extraction of Images for 3D Image

Figure 8:
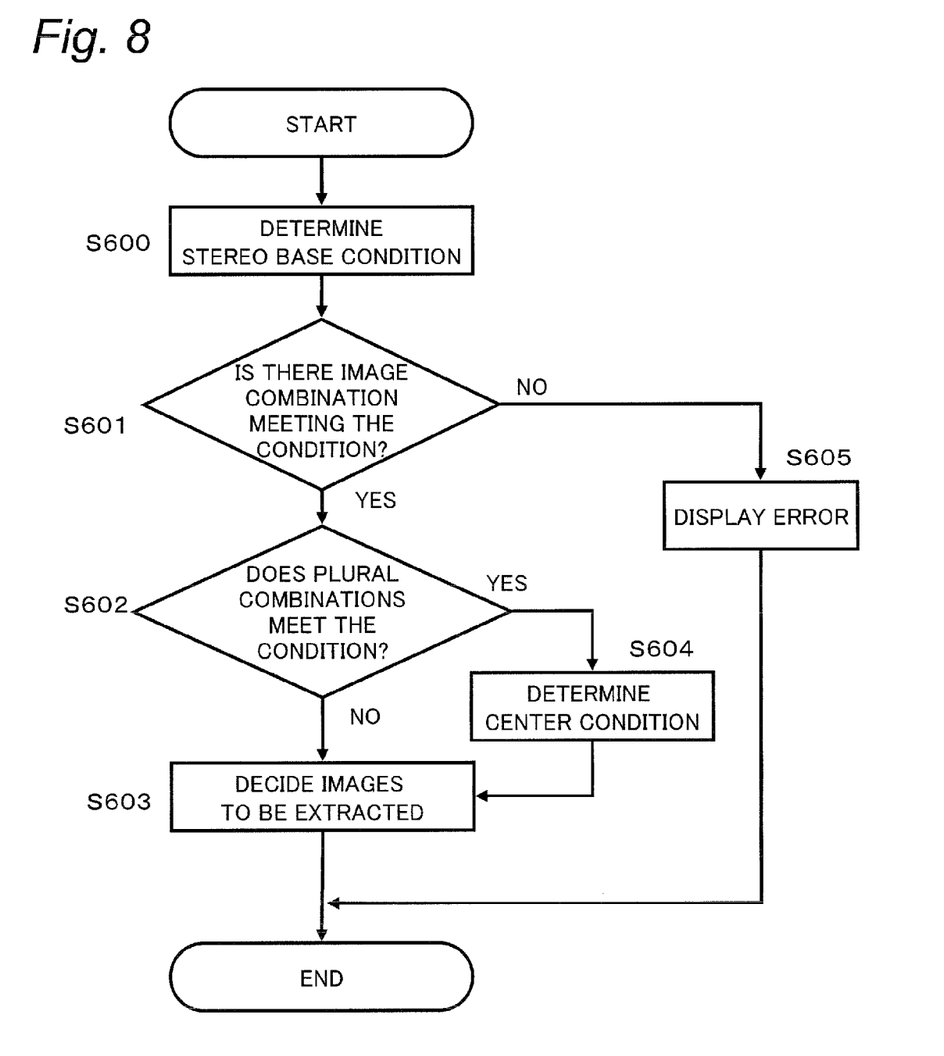
FIG. 8 is a flow chart of extraction of images for a 3D image.

With reference to FIG. 8, an operation for extracting images for a 3D image (the step S404 in FIG. 4) is described. After generating plural images through the slide continuous recording operation, the controller 130 extracts optimum two images for generating a 3D image from the plural images.

At first, the controller 130 reads, from the buffer memory 124, the plural images generated through the slide continuous recording operation. Further, the controller 130 determines, between the plural images read therefrom, the amounts of movements of pixels in a characteristic area in these images. Such characteristic area can be a focused area or a face area.

Next, the controller 130 reads, from the flash memory 142, a correspondence table representing relationship between stereo base and amount of movement of pixel. According to the correspondence table, the controller 130 determines the distance of stereo base which correspond to the determined amount of pixel movement.

Subsequently, the controller 130 reads, from the flash memory 142, a reference distance information for the stereo base suitable for the user to view 3D image. The controller 130 determines combinations of images providing stereo bases within a permissible distance range from the reference distance for the stereo-base from plural combinations of images (S600). Hereinafter, the condition that a combination of images has a stereo base within a permissible distance range from the reference distance for the stereo-base is referred to as a "stereo base condition".

The controller 130 determines whether or not there is at least one combination of images which satisfies the stereo base condition (S601). If there is no combination satisfying the stereo base condition (No in S601), the controller 130 displays an error display on the liquid crystal display monitor 123 (S605). Then, the controller 130 completes the image extracting operation.

On the other hand, if there exists a combination satisfying the stereo base condition (Yes in S601), the controller 130 erases the images which are not combined with any other images and stores the images which are combined with any other images in the buffer memory 124.

Subsequently, the controller 130 determines whether or not there exist two or more combinations satisfying the stereo base condition (S602). If there exist two or more such combinations (Yes in S602), the controller 130 selects a combination having the most preferable condition (a center condition) (S604) and determines the combination to be images for generating a 3D image (S603). Such a combination satisfying the most preferable condition (the center condition) is a combination having a difference in angle which is closest to zero.

On the other hand, if there exists only one combination satisfying the stereo base condition (No in S602), the controller 130 determines the combination to be images for generating a 3D image (S603).

As described above, the controller 130 selects a combination satisfying the stereo base condition and the center condition (as required), out of the plural images generated through the continuous recording, as images for generating a 3D image. In cases where the sliding direction for the slide continuous recording is set to a direction from a left-hand side to a right-hand side, an image captured earlier is determined to be a left-eye image, while an image captured later is determined to be a right-eye image. By using the two images, it is possible to realize a 3D image.

3. Summary of Present Embodiment

As described above, the digital camera 100 according to the present embodiment is adapted to display, on the liquid crystal display monitor 123, a guiding display indicative of the direction in which the user should slide or move the digital camera 100 in the slide 3D recording mode while changing the guiding display at predetermined intervals. This enables the user to easily grasp the direction and the timing for sliding or moving the digital camera 100. Since the slide 3D continuous recording is done by a user's sliding or moving the digital camera 100 according to the guiding display being displayed on the liquid crystal display monitor 123, the digital camera 100 can easily obtain a left-eye image and a right-eye image suitable for generating a 3D image.

4. Other Embodiments

The embodiment is not limited to the aforementioned embodiment. Other embodiments are described below.

While, in the aforementioned embodiment, the CCD image sensor 120 is described as an example of an imaging unit, the imaging unit is not limited thereto. The imaging unit may be other imaging device such as a CMOS image sensor or an NMOS image sensor.

Further, in the aforementioned embodiment, there has been exemplified the guiding display which is adapted to move the mark 302 in the display frame 301, for providing the user an indication as to the direction in which the user should move the digital camera 100. However, the guiding display may have a different structure. For example, instead of the mark 302, a progress bar may be changed in the direction of sliding in order to provide the user with an indication as to the direction in which the user should move the digital camera 100. The "progress bar" is a displayed bar which expands in a frame according to the state of progress.

Figure 9A:
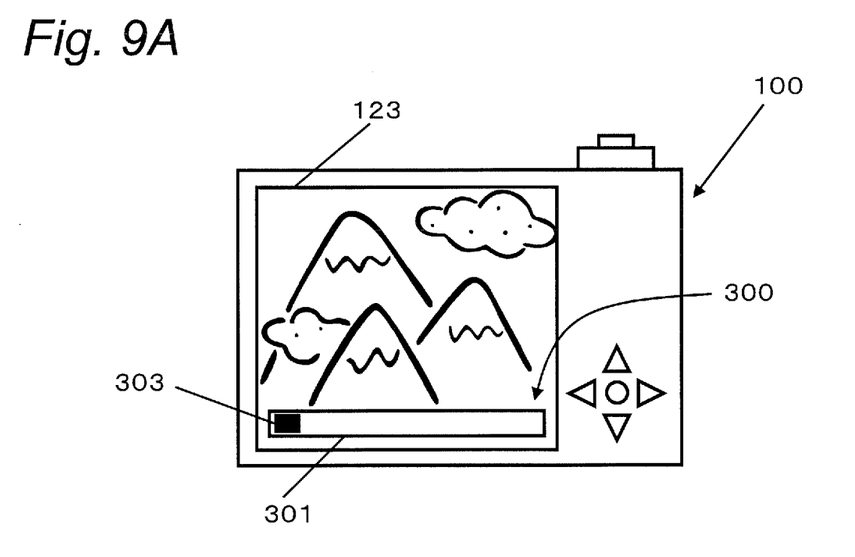
FIGS. 9A and 9B are views illustrating a display of a progress bar.
Figure 9B:
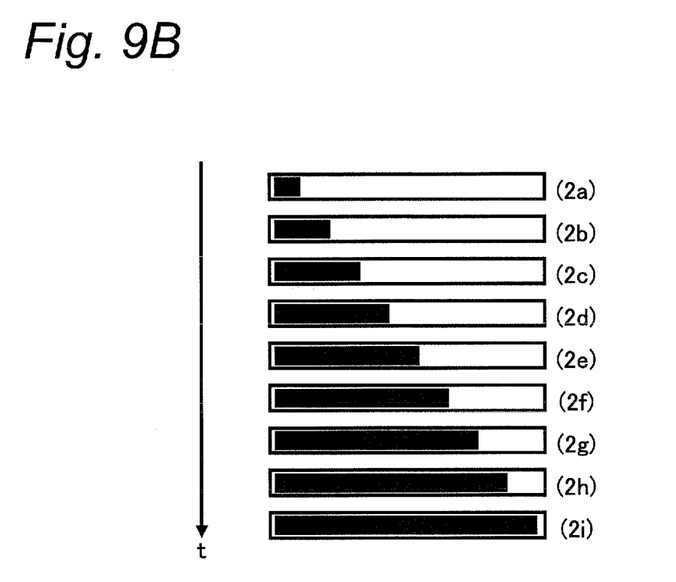

With reference to FIGS. 9A and 9B, a progress bar in the slide 3D recording mode is described. FIG. 9A illustrates a display on the liquid crystal display monitor 123 in the slide 3D recording mode. FIG. 9B illustrates changes of the progress bar in the slide 3D recording mode. As illustrated in FIG. 9A, the controller 130 displays, on the liquid crystal display monitor 123, the progress bar 303 which changes its length in proportion to the number of images captured along with the progress of a slide continuous recording operation (the step S402 in FIG. 4). Namely, the controller 130 displays the progress bar 303 on the liquid crystal display monitor 123 such that the length of the progress bar 303 increases with an increase of the number of continuously captured images. The progress bar 303 expands in the same direction as the direction in which the user should slide the digital camera 100 in order to provide the user with an indication as to the direction in which the user should slide the digital camera 100.

The progress bar 303 changes as in FIG. 9B. The progress bar 303 expands from (2a) in FIG. 9B to the length illustrated in (2i), with an increase of the number of continuously recorded images. When the first image is captured during the continuous recording, the progress bar 303 has the smallest length (2a). Further, when the order of captured image is in the middle of all of the continuously recorded images, the progress bar 303 has a length equal to half that of the display frame 301 (2e). When the last image is captured, the progress bar 303 has the same length as that of the display frame 301 (2i). After the completion of the continuous recording in the slide recording, the controller 130 performs preview-displaying of the last captured image on the liquid crystal display monitor 123. Subsequently and after the elapse of a predetermined time (about several seconds), the controller 130 returns the digital camera 100 to a recording standby state before a start of the slide continuous recording (S400 in FIG. 4). In the recording standby state before a start of the sliding recording, the controller 130 displays the progress bar 303 on the liquid crystal display monitor 123, keeping the progress bar 303 in a state of the first image as shown in (2a). As described above, the progress bar 303 is displayed on the liquid crystal display monitor 123 such that it expands in the direction in which the user should slide and move the digital camera 100, along with the progress of continuous recording, which enables the user to easily grasp the direction in which the user should slide or move the digital camera.

Further, while the position of the mark 302 or the length of the progress bar 303 is made to be in proportion to the number of continuously recorded images, the manner of changing the position of the mark 302 or the length of the progress bar 303 is not limited thereto. In cases where the total continuously recording time during the slide recording is fixed and known in advance, the position of the mark 302 or the length of the progress bar 303 may be changed in proportion to the continuous recording progressing time, namely at constant intervals. For example, when the total continuous recording time is 4 seconds, and the total number of images to be continuously recorded is 20, a time required for one image is 0.2 second. Accordingly, the position of the mark 302 or the length of the progress bar 303 can be changed, after each elapse of 0.2 second. Here, it goes without saying that the position of the mark 302 or the length of the progress bar 303 should be changed in the same direction as the direction in which the user should slide or move the digital camera 100. Even with this method for providing an indication as to the direction of sliding or moving, it is possible to enable the user to easily grasp the direction in which the user should slide or move the digital camera 100, similarly to with the aforementioned method. Here, it goes without saying that the "0.2 second" is information based on the timing at which an image is generated thorough the continuous recording.

Further, while the digital camera 100 according to the aforementioned embodiment has been described as performing the slide continuous recording by a horizontal shooting, as an example, the direction of the digital camera 100 is not limited thereto. The digital camera 100 can be also configured to perform the slide continuous recording by a vertical shooting. The "horizontal shooting" refers to shooting an image with the digital camera 100 held by the user in such a way that the orientation of the shorter side of the liquid crystal display monitor 123 is coincident with the vertical direction. The "vertical shooting" refers to shooting with the digital camera 100 held by the user in such a way that the orientation of the longer side of the liquid crystal display monitor 123 is coincident with the vertical direction. In cases of performing the slide continuous recording by the vertical shooting, the user should hold the digital camera 100 with both hands, in order to set the digital camera 100 in the vertical direction. When the user holds the digital camera 100 in the vertical direction, the liquid crystal display monitor 123 is in a state where the longer side of its screen is along the vertical direction, while the shorter side of the screen is along the horizontal direction. In cases of the vertical shooting, the direction of sliding in the slide 3D recording mode is along the direction of the shorter side of the liquid crystal display monitor 123. In cases of the vertical shooting, the display bar 300 is displayed on the liquid crystal display monitor 123 such that it is placed in parallel with the shorter side of the liquid crystal display monitor 123. The mark 302 for providing an indication as to the direction of sliding of the digital camera 100 is moved in the left-to-right direction in the display bar 300.

Further, while, in the aforementioned embodiment, the direction of sliding of the digital camera 100 in the slide 3D recording mode has been described as the direction from a left-hand side to a right-hand side with respect to the user, the direction of sliding is not limited thereto. The direction of sliding of the digital camera 100 may be the direction from a right-hand side to a left-hand side with respect to the user. In this case, the mark 302 for providing the user an indication as to the direction of sliding is moved in the direction from a right-hand side to a left-hand side, on the liquid crystal display monitor 123. Further, in extracting two images for a 3D image, an image captured earlier is determined to be a right-eye image, while an image captured later is determined to be a left-eye image.

Further, while, in the aforementioned embodiment, there has been described a slide 3D recording mode for capturing images for generating a 3D image, as a slide 3D recording mode, the recording mode is not limited thereto. The concept of the present embodiment can be also applied to other modes for performing continuous recording while moving the casing 180. For example, it can be also applied to a mode for capturing images for generating panorama images (a panorama recording mode). This is described below with reference to FIG. 10.

Figure 10:
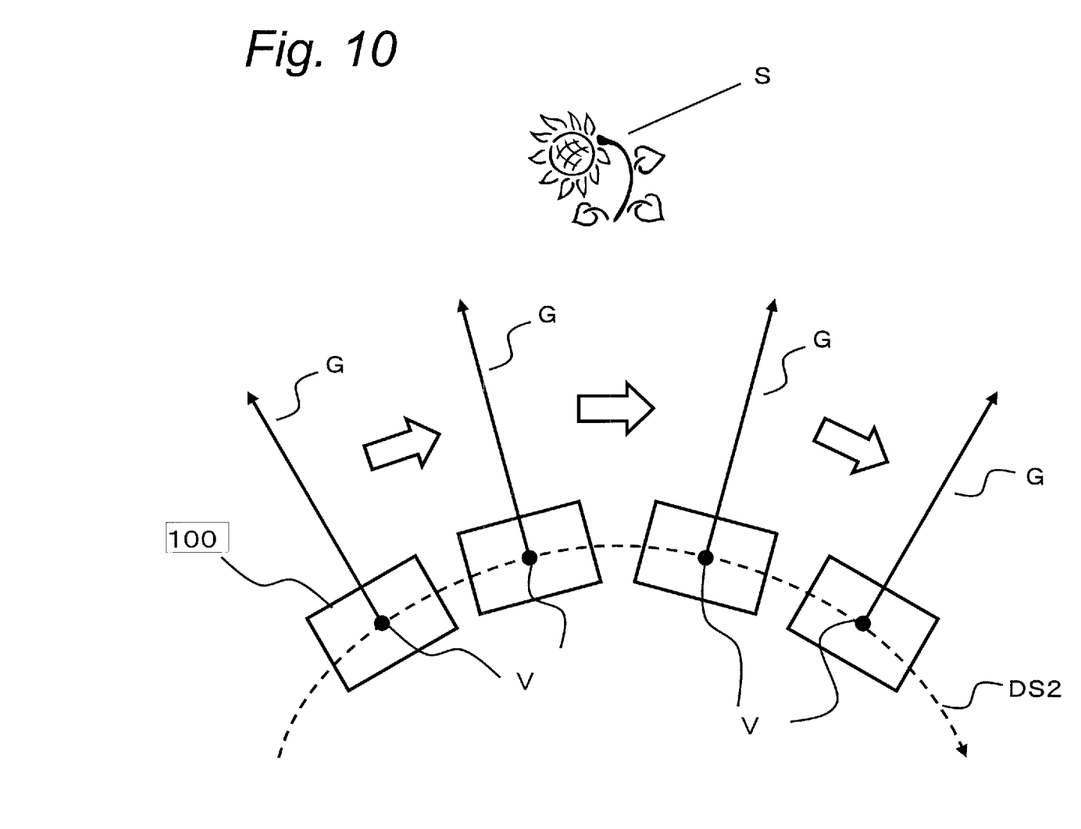
FIG. 10 is a view for illustrating movements of the digital camera in another example.

In FIG. 10, "S" indicates a subject, "G" indicates the direction of the line of sight of the digital camera 100 (the direction of the optical axis of the optical system 110), "V" indicates the point of view of the digital camera 100 (the position of the CCD image sensor 120), and "DS2" indicates a locus of the point of view. As aspects of moving shooting with the digital camera 100, there are a slide moving shooting as illustrated in FIG. 5 and a swing moving shooting as illustrated in FIG. 10. The slide moving shooting as illustrated in FIG. 5 is an aspect of shooting in which only the position of the point of view V is changed while the direction of the line of sight G with respect to the subject S is not changed. In such slide moving shooting, the user moves the point of view V (the CCD image sensor 120), such that the distance between the locus of the point of view DS2 (the line connecting the positions of the point of view V) of the digital camera 100 and the subject S is kept constant.

On the other hand, the swing moving shooting is an aspect in which the user performs shooting while swinging the digital camera 100 about the position of the user. As illustrated in FIG. 10, in such swing moving shooting, the user performs a shooting operation while changing the direction of the line of sight G, as well as changing the position of the point of view V of the digital camera 100. The aforementioned guiding display for indicating the direction of moving can also be applied to such a swing moving shooting in order to provide the user with an indication as to the direction of moving. Namely, the aforementioned guiding display can be applied to any mode in which the user performs shooting while moving the casing 180, in such a way as to change at least one of the position of the point of view V and the direction of the line of sight G. The digital camera 100 extracts a predetermined number of images out of plural images obtained through the swing moving shooting, and further combines the predetermined number of images with each other to generate a panorama image.

Further, while, in the aforementioned embodiment, the display object such as the mark 302 or the progress bar 303 displayed on the liquid crystal display monitor 123 are changed, based on the number of images indicative of the state of the progress of continuous recording, and based on the continuous recording progressing time, the embodiment is not limited thereto. The guiding display can be changed based on any information based on the timing at which images are generated during the continuous recording, besides the information about the number of images indicative of the state of the progress of the continuous recording, and the information about the continuous recording progressing time. By using such information based on the timing at which images are generated during the continuous recording, the digital camera 100 is enabled to provide the user with a dynamic indication as to the direction in which the casing 180 should be moved, without using a velocity sensor (such as a gyro sensor or a motion-vector detection sensor, for example) or other devices.

Further, while, in the aforementioned embodiment, there has been described an example where the continuous recording is started in response to press of the release button 201, the embodiment is not limited thereto. Namely, in cases where the liquid crystal display monitor 123 further includes a touch panel, the continuous recording can be started in response to touch of the touch panel.

Also, the embodiment can be applied to a lens-integrated type camera or a lens-detachable type camera.

INDUSTRIAL APPLICABILITY

The embodiment can be also applied to an imaging apparatus, such as a digital camera, a movie camera, and a camera-equipped information terminal.

What is claimed is:

1. An imaging apparatus comprising:
   a display unit;
   an imaging unit adapted to successively capture an image of a subject and successively generate image data; and
   a controller adapted to control a display of a guiding display displayed on the display unit to display the guiding display continuously and to change the guiding display in a specific direction at a predetermined timing in a predetermined photographing mode while the guiding display is continuously displayed on the display unit, the guiding display indicating a direction in which the imaging apparatus is to be moved by a user, by changing a position or size of the guiding display on a screen of the display unit while the guiding display is continuously displayed on the display unit, wherein:
   the guiding display includes a mark or a progress bar; and
   the controller is adapted to change the position of the mark or the size of the progress bar on the screen of the display unit at the specific direction at the predetermined timing to indicate the direction in which the imaging apparatus is to be moved by the user.

2. The imaging apparatus according to claim 1, wherein the predetermined photographing mode is a mode for capturing an image with the imaging apparatus being moved by a user in the specific direction, and the specific direction is a direction in which the imaging apparatus is moved.

3. The imaging apparatus according to claim 1, wherein the predetermined photographing mode is a 3D recording mode for generating a 3D image, and the controller is adapted to extract at least two images satisfying a predetermined condition from plural pieces of image data generated successively by the imaging unit, and generates a 3D image by using one of the two images as a left-eye image and using the other of the two images as a right-eye image.

4. The imaging apparatus according to claim 1, wherein the predetermined photographing mode is a panorama recording mode, and the controller is adapted to combine a predetermined number of image data in plural pieces of image data generated successively by the imaging unit to generate a panorama image.

5. The imaging apparatus according to claim 1, wherein the controller is adapted to change the position of the mark displayed on the display unit, based on a predetermined timing.

6. The imaging apparatus according to claim 1, wherein the controller is adapted to change a length of the progress bar displayed on the display unit, based on a predetermined timing.

7. The imaging apparatus according to claim 1, wherein the controller is adapted to change the guiding display displayed on the display unit, at a constant interval.

8. The imaging apparatus according to claim 1, wherein the controller is adapted to change the guiding display displayed on the display unit, at a timing synchronized with a timing at which the imaging unit generates image data.

9. The imaging apparatus according to claim 2, wherein the predetermined photographing mode is a 3D recording mode for generating a 3D image, and the controller is adapted to extract at least two images satisfying a predetermined condition from plural pieces of image data generated successively by the imaging unit, and generates a 3D image by using one of the two images as a left-eye image and using the other of the two images as a right-eye image.

10. The imaging apparatus according to claim 2, wherein the predetermined photographing mode is a panorama recording mode, and the controller is adapted to combine a predetermined number of image data in plural pieces of image data generated successively by the imaging unit to generate a panorama image.

11. The imaging apparatus according to claim 2, wherein the controller is adapted to change the position of the mark displayed on the display unit, based on a predetermined timing.

12. The imaging apparatus according to claim 2, wherein the controller is adapted to change a length of the progress bar displayed on the display unit, based on a predetermined timing.

13. The imaging apparatus according to claim 2, wherein the controller is adapted to change the guiding display displayed on the display unit, at a constant interval.

14. The imaging apparatus according to claim 2, wherein the controller is adapted to change the guiding display displayed on the display unit, at a timing synchronized with a timing at which the imaging unit generates image data.

15. The imaging apparatus according to claim 1, wherein the imaging unit generates consecutively photographed images, and the controller controls the display of the guiding display displayed on the display unit to change the guiding display based on a timing in which the photographed images are generated.

* * * * *